Dec. 4, 1973 R. H. ASHWORTH ET AL 3,776,828
METHOD OF EMBOSSING THE SURFACE OF A METAL WORKPIECE
Original Filed April 15, 1970 2 Sheets-Sheet 2
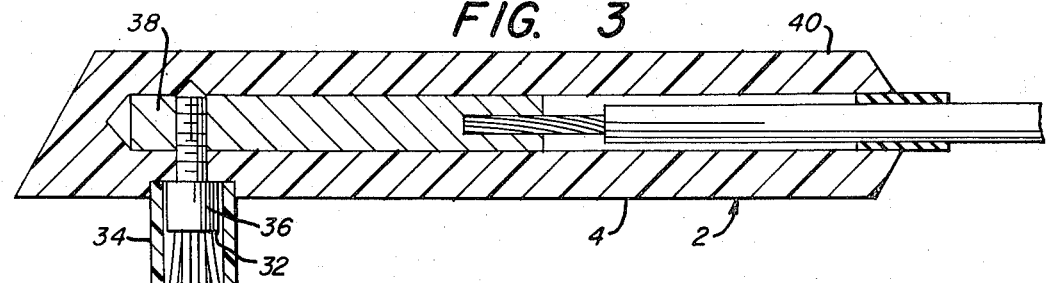
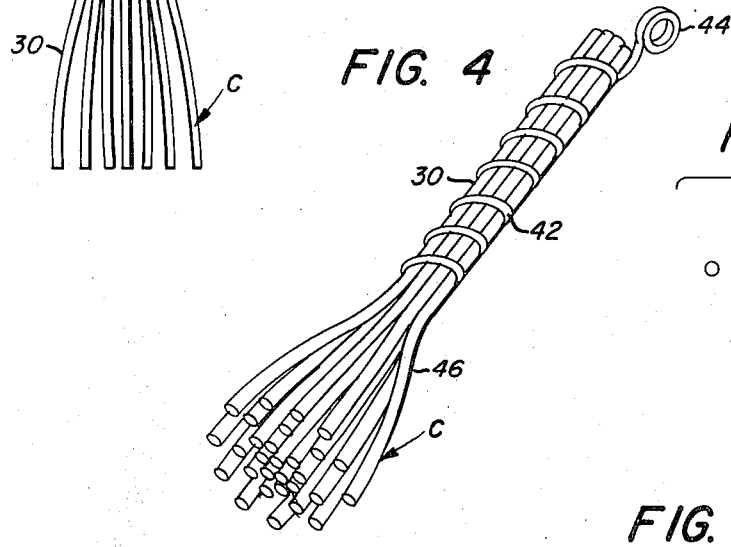
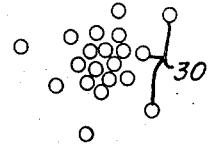
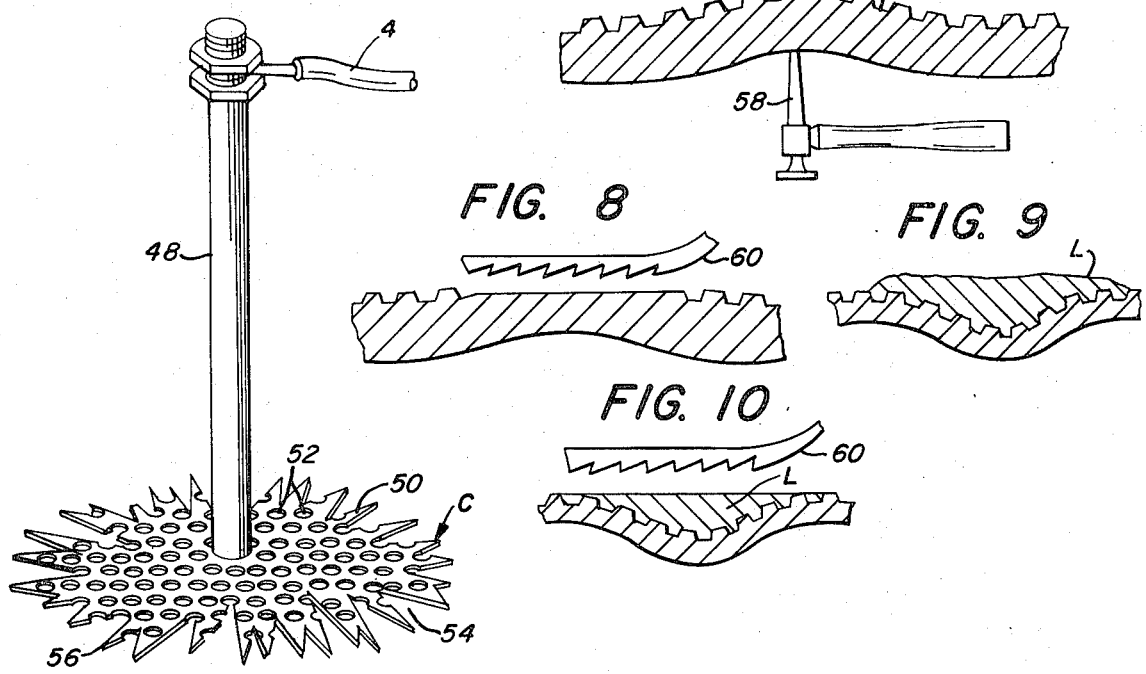

United States Patent Office 3,776,828
Patented Dec. 4, 1973

3,776,828
METHOD OF EMBOSSING THE SURFACE OF A METAL WORKPIECE
Robert H. Ashworth, Penn Hills Township, Allegheny County, Pa., assignor to United States Steel Corporation
Original application Apr. 15, 1970, Ser. No. 28,901, now Patent No. 3,704,220. Divided and this application May 12, 1972, Ser. No. 252,869
Int. Cl. B23p 1/00
U.S. Cl. 204—129.65   8 Claims

ABSTRACT OF THE DISCLOSURE

The embossed surface of a metal workpiece is repaired by utilizing an electrode having relatively closely spaced discharge areas adjacent its center and relatively widely spaced discharge areas at its outer portion. A dent is first repaired by filling it with a metal to the level of the surrounding surface or by bending the metal of the dent back into its original position. A suitable stencil is placed on the prepared surface to be repaired and a pad saturated with electrolytic fluid is placed on the stencil. The electrode and workpiece are connected to opposite poles of a D.C. power source and the free end of the electrode is pressed into the pad. During the repair embossing operation the electrode is occasionally lifted from the pad and then lowered into the pad in a slightly different position.

BACKGROUND OF THE INVENTION

This application, which is a division of my copending application Ser. No. 28,901, filed Apr. 15, 1970, now U.S. Pat. No. 3,704,220, relates to a method of embossing the surface of a metal workpiece and more particularly to the repair of embossed metal sheets. Many of these sheets consist of a coined texture having a plurality of flat bottom embossments rolled into one of the flat surfaces of the sheet. The depth of the embossment may vary from a fraction of a thousandth of an inch to several thousandths of an inch. The term embossment is used in its broadest sense herein and includes any texture having high and low spots. The market for embossed sheets has been restricted because of the difficulty in repairing the sheet when it is damaged. For example, it is used in the automotive field, but without wide acceptance because dents occurring in the sheet before, during or after assembly are difficult to repair. Various procedures have been suggested for repairing the damaged portions, but all methods have been unsatisfactory for various reasons. Those methods which are relatively inexpensive did not produce the same texture as that of the original embossing. Those methods which can produce a satisfactory texture are too expensive, time consuming, and/or difficult to control.

OBJECTS OF THE INVENTION

It is therefore an object of my invention to provide an inexpensive method of embossing sheets.

Another object is to provide a method of repairing embossed sheets, which, except for the electrode, utilizes commercially available equipment and electrolytes.

A further object of my invention is to provide such a method which accurately and repetitively reproduces the original pattern in the embossed sheet.

DESCRIPTION OF THE DRAWINGS

These and other objects will be more apparent after referring to the following specification and attached drawings, in which:

FIG. 3 is a sectional view of an electrode of my invention;

FIG. 4 is a perspective view showing a second electrode of my invention;

FIG. 5 is an end view showing the arrangement of the wires of the electrodes of FIGS. 3 and 4;

FIG. 6 is a perspective view showing a third type of electrode of my invention;

FIG. 7 is a view showing a step in one method of my invention;

FIG. 8 is a view showing another step in the practice of the same method of my invention;

FIG. 9 is a view showing a step in a second method of my invention; and

FIG. 10 is a view showing a further step in the practice of the second method of my invention.

DETAILED DESCRIPTION

Figure 1:
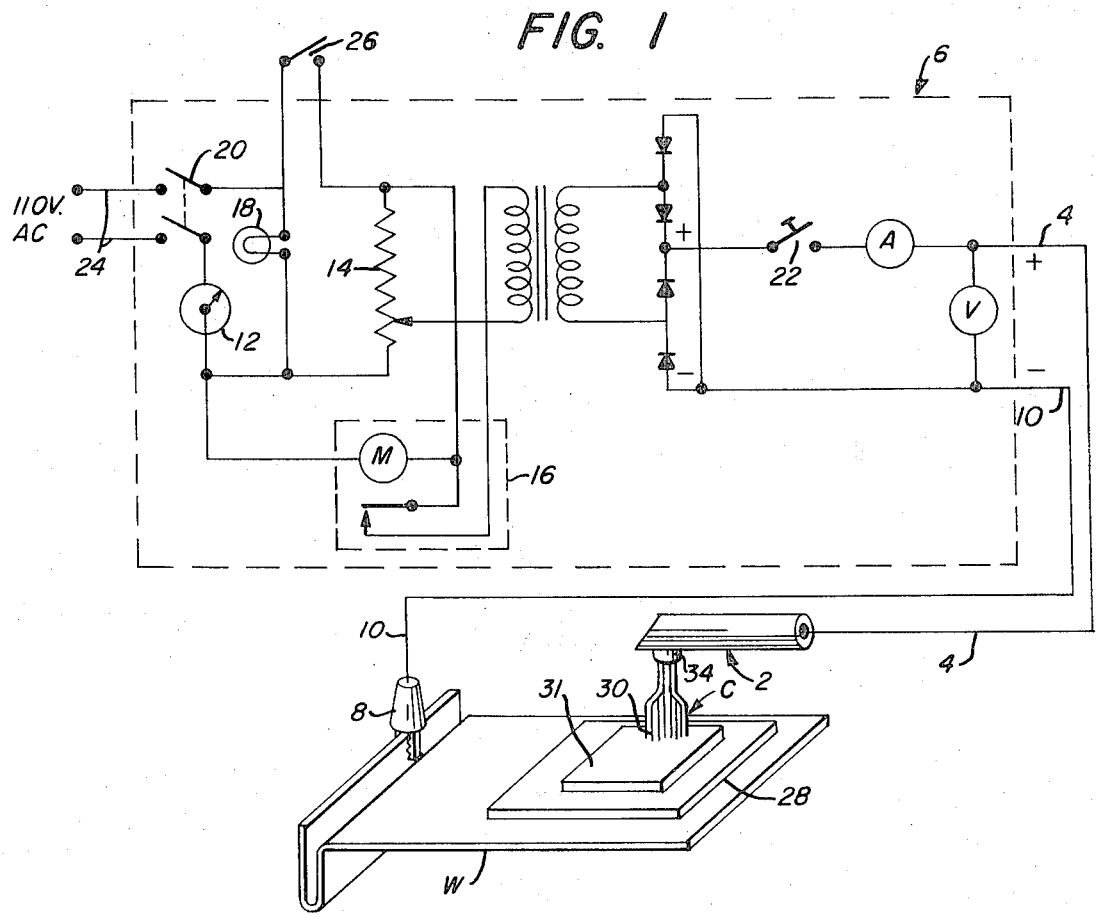
FIG. 1 is a schematic view of a D.C. power source connected to the apparatus used with my invention.
Figure 2:
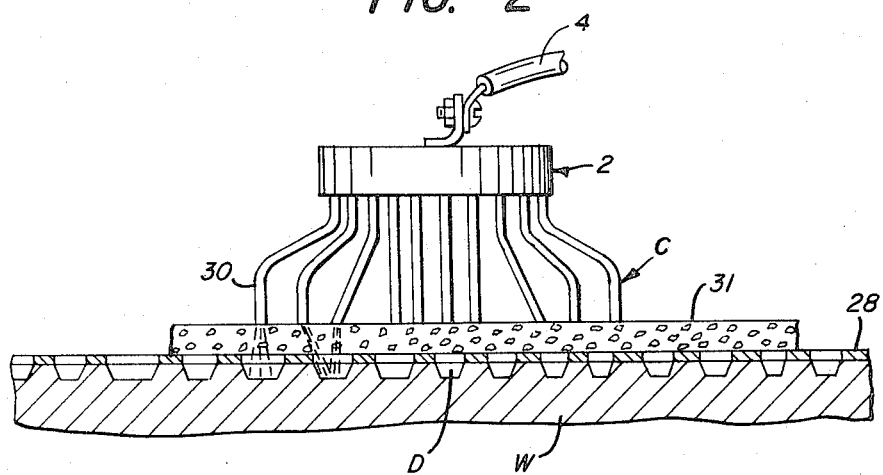
FIG. 2 is an enlarged view, partly in section, of the electrode and associated parts supported on a workpiece.

Referring more particularly to FIGS. 1 and 2 of the drawings, reference numeral 2 indicates the electrode used in my invention, the details of which will be described later. The electrode 2 is connected by lead 4 (FIGS. 1-3) to one terminal of a conventional D.C. power source 6 (FIG. 1) and metal workpiece W (FIGS. 1, 2) is connected to the other terminal by means of contact clip 8 and lead 10 (FIG. 1). The power source 6 includes a timer 12 (FIG. 1), power level control 14, interrupter switch 16, pilot light 18, on-off switch 20 and reset button 22. The power source 6 is energized by placing its terminal 24 (FIG. 1) in a 110 volt A.C. outlet. A foot switch 26 (FIG. 1) energizes the electrode 2. Since these parts are conventional and form part of a conventional power source they need not be described in detail. Suitable power sources are Catalogue Nos. V45A, VT45A and VTT45A sold by the Lectroetch Company of Cleveland, Ohio. A dielectric stencil 28 (FIGS. 1, 2) having the desired design is placed on the workpiece W over the surface to be embossed and a pad 31 (FIGS. 1, 2) saturated with electrolyte is placed on the stencil 28. Any suitable electrolyte may be used. When etching steel this may include a water solution of magnesium chloride, citric acid and sodium citrate. When etching lead the electrolyte may be a water solution of ammonium nitrate, citric acid and sodium citrate.

ELECTRODE 2

As shown in FIG. 3 the electrode 2 includes a plurality of stiff stainless steel wires 30 (FIGS. 1-5) having one end soldered into a copper sleeve 32 (FIG. 3) which is surrounded by an insulating sleeve 34 (FIGS. 1, 3). A brass plug 36 (FIG. 3) also secured in sleeve 32 is threaded into a round brass rod 38 (FIG. 3). Lead 4 is soldered into rod 38 and the assembly enclosed in insulation 40 such as Micarta.

ALTERNATIVE ELECTRODES

The electrode shown in FIG. 4 also include a plurality of wires 30 which are bound together at one end by means of a spring wire 42 spirally wound about wires 30 and having an electrical terminal 44 for connection to lead 4. In both of these embodiments the wires 30 are spread apart at point 46 which is preferably between ¼ and one inch from their free end. The inner wires 30 are relatively close together, but are spaced apart to permit escape of the gas which is generated in the electrolysis. The outer wires 30 are relatively widely spaced so as to allow a visually feathered etching pattern to develop.

FIG. 6 shows another suitable electrode which includes a conductive rod 48 having a conductive metal plate 50 at its free end. The plate 50 has a plurality of holes 52 therein to permit escape of evolved gases and a plurality of triangular cut out portions 54 around its outer periphery which form spaced peripheral points 56. Although the cut out portions 54 may be symmetrical, it is preferred that they be non-symmetrical as shown.

It will be noted that in all three embodiments shown the conductor or free end C of the electrode 2 has relatively closely spaced discharge areas or surfaces adjacent its center and relatively widely spaced discharge areas or surfaces at its outer portion or periphery.

Since my invention is of prime importance in repairing embossed sheets, the operation will be described with respect thereto. In repairing dented embossed sheets without the addition of material the operation is as follows:

OPERATION

If the dent is an inward dent or is not of sufficient height it is pressed out from the reverse side with an appropriate tool 58 (FIG. 7) until the bottom of depressions D (FIGS. 2, 7) at the dent are above the top of the surrounding surface. The damaged area is then filed down by file 60 until its top surface is in the same plane as the top of the surrounding surface as shown in FIG. 8. Oil and dirt are then removed from the damaged and surrounding area by means of a suitable solvent such as trichloroethylene or methyl ethyl ketone. The appropriate stencil 28 is then placed over the damaged area and the pad 31 saturated with electrolyte fluid placed on top of the stencil 28. The timer 12 is set for the appropriate time, preferably 30 seconds, and the power level 14 set for the appropriate level, preferably 70%. With the workpiece W insulated from ground the contact clip 8 is attached thereto. The interrupter switch 16 is turned on and the pilot light 18 will be on if everything is in order. If the light 18 is not on, the reset button 22 is pushed and investigation made to determine any trouble. With everything in order, thet electrode 2 is placed gently into the pad 30 over the damaged area and the switch 26 closed to energize the electrode 2. As the etching proceeds the electrode 2 is occasionally lifted, moved slightly in a generally circular direction and then gently lowered into the pad 31. This circular motion in small steps will help insure a "feathering" of the newly etched area into the adjacent embossed pattern. Each time the power is disconnected by timer 12 the electrode 2 is raised slightly, the pad 31 moistened with the electrolyte fluid and the electrode 2 then lowered. The foot switch 26 is next released and then depressed, after which operation continues as before. When the embossing is completed to the desired depth the switch 26 is opened, the power turned off and the pad 31 and stencil 28 removed. The electrolyte is then wiped from the repaired surface and a standard cleaner protector applied thereto with a cloth. This serves to neutralize the electrolyte and deposit a water soluble protective oil coating.

In repairing dented embossed sheets with the addition of material the operation is as follows: If the dent is an outward dent or is not of sufficient depth it is pressed out from the top side with tool 58 until the top of the damaged surface is substantially below the bottom of depressions D of the surrounding surface. Using heat, flux, and solder in the usual manner the depressed area is filed with lead L (FIG. 9) or other material having a melting point below that of the workpiece in the amount shown in FIG. 9. The lead L is then filed down by file 60 until the top surface is in the same plane as the top of the surrounding surface as shown in FIG. 10. The operation then proceeds as before execpt that a different electrolyte will be used.

While several embodiments of my invention have been shown and described, it will be apparent that other adaptations and modifications may be made without departing from the scope of the following claims.

I claim:

1. The method of embossing the surface of a metal workpiece which comprises providing an electrode having a conductor end with relatively closely spaced discharge surfaces adjacent its center and relatively widely spaced discharge surfaces at its outer portion, placing a stencil on the surface to be embossed, placing a pad saturated with electrolyte fluid on the stencil, connecting said electrode and workpiece to opposite poles of a D.C. power source, and then bringing the free end of said electrode into the pad.

2. The method of claim 1 which includes occasionally lifting the electrode from said pad, and then lowering said electrode onto said pad in a slightly different position, the positions of said electrode being in a generally circular path.

3. The method of claim 1 in which the metal workpiece is embossed and has a damaged portion to be repaired; which method includes providing a surface at the damaged portion in substantially the same plane as the top of the embossed surface surrounding the damaged portion, said stencil being placed over said provided surface, and said embossing continuing until a surface is obtained of substantially the same texture as that surrounding the provided surface.

4. The method of embossing the surface of a metal workpiece including the steps of:
    (a) providing an electrode having a conductor end with relatively closely spaced discharge surfaces adjacent its center and relatively widely spaced discharge surfaces at its outer portion;
    (b) placing a stencil on the surface to be embossed;
    (c) placing a pad saturated with electrolyte fluid on the stencil;
    (d) connecting said electrode and workpiece to opposite poles of a D.C. power source;
    (e) bringing the free end of said electrode into the pad to emboss said metal workpiece;
    (f) providing a surface at a damaged portion of said metal workpiece by raising the damaged portion above the surrounding surface until the bottom of the damaged embossing is at least on the same level as the top of the surrounding surface;
    (g) then removing the raised portion until it is in substantially the same plane as the top of the embossed surface surrounding the damaged portion; and
    (h) continuing said embossing until a surface is obtained of substantially the same texture as that surrounding the provided surface.

5. The method recited in claim 4 including the step of winding a spring wire helically around the end of said electrode opposite to said conducting end of said electrode.

6. The method recited in claim 4 including the step of applying a holding plug to the end of said electrode opposite to said conducting end of said electrode.

7. The method recited in claim 4 including the steps of applying a conductor plate to the conducting end of said electrode and providing a plurality of gas escape holes in said conductor plate.

8. The method of embossing the surface of a metal workpiece including the steps of:
    (a) providing an electrode having a conductor end with relatively closely spaced discharge surfaces adjacent its center and relatively widely spaced discharge surfaces at its outer portion;
    (b) placing a stencil on the surface to be embossed;
    (c) placing a pad saturated with electrolyte fluid on the stencil;
    (d) connecting said electrode and workpiece to opposite poles of a D.C. power source;
    (e) bringing the free end of said electrode into the pad to emboss said metal workpiece;
    (f) providing a surface at a damaged portion of said metal workpiece by depressing the damaged portion below the surrounding surface;

(g) filling the depressed portion with a metal having a lower melting point than the workpiece;

(h) removing any portion of the added metal necessary to bring its top surface into substantially the same plane as the top of the embossed surface surrounding the damaged portion; and (i) continuing said embossing until a surface is obtained of substantially the same texture as that surrounding the provided surface.

References Cited

UNITED STATES PATENTS

| | | | |
|---|---|---|---|
| 2,306,082 | 12/1942 | Prest | 204—129.65 |
| 2,463,711 | 3/1949 | Nagle | 204—129.65 |
| 3,290,236 | 12/1966 | Mayer | 204—129.65 |
| 1,545,942 | 7/1925 | Conlin | 204—224 |

THOMAS TUFARIELLO, Primary Examiner

U.S. Cl. X.R.

204—129.35